(12) United States Patent
Ficara et al.

(10) Patent No.: US 12,550,172 B2
(45) Date of Patent: Feb. 10, 2026

(54) DESTINATION-BASED AUTOMATED FREQUENCY COORDINATION

(71) Applicant: Cisco Technology, Inc., San Jose, CA (US)

(72) Inventors: Domenico Ficara, Essertines-sur-Yverdon (CH); Alessandro Erta, Licciana Nardi (IT); Roberto Muccifora, Ropraz (CH); Amine Choukir, Lausanne (CH); Pascal Thubert, Roquefort les Pins (FR); Salvatore Valenza, Pomy (CH); Arun Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 379 days.

(21) Appl. No.: 18/226,573

(22) Filed: Jul. 26, 2023

(65) Prior Publication Data

US 2025/0039912 A1    Jan. 30, 2025

(51) Int. Cl.
*H04W 72/51* (2023.01)
*H04W 64/00* (2009.01)
*H04W 72/0453* (2023.01)

(52) U.S. Cl.
CPC ........... *H04W 72/51* (2023.01); *H04W 64/00* (2013.01); *H04W 72/0453* (2013.01)

(58) Field of Classification Search
CPC .. H04W 72/51; H04W 64/00; H04W 72/0453
See application file for complete search history.

(56) References Cited

U.S. PATENT DOCUMENTS

| | | | |
|---|---|---|---|
| 11,510,065 B2 | 11/2022 | Damnjanovic et al. | |
| 11,589,265 B2 | 2/2023 | Desai et al. | |
| 2021/0120556 A1 | 4/2021 | Segev et al. | |
| 2022/0224496 A1 | 7/2022 | Kalenahalli et al. | |
| 2022/0256547 A1 | 8/2022 | Macmullan et al. | |
| 2022/0272544 A1* | 8/2022 | Chitrakar | H04W 48/12 |
| 2022/0329979 A1 | 10/2022 | Ansley et al. | |

* cited by examiner

*Primary Examiner* — Curtis B Odom
(74) *Attorney, Agent, or Firm* — Lee & Hayes, P.C.

(57) ABSTRACT

In one embodiment, a device determines a physical location of a mobile client of wireless network. The device performs a frequency lookup for the mobile client from an AFC service using the physical location of the mobile client. The device selects a frequency to be used by the mobile client based on the frequency lookup. The device causes the mobile client to use the frequency to communicate with the wireless network.

20 Claims, 10 Drawing Sheets

DESTINATION-BASED AUTOMATED FREQUENCY COORDINATION

TECHNICAL FIELD

The present disclosure relates generally to computer networks, and, more particularly, to destination-based automated frequency coordination.

BACKGROUND

The use of 6 GHz frequencies in telecommunications is becoming more and more prevalent. The utilization of 6 GHz frequencies in telecommunications can be particularly of interest in scenarios for providing wireless connectivity to moving nodes, such as fast-moving trains, amusement park rides, autonomous robots, and the like, as the 6 GHz band offers a large amount of bandwidth. Generally, a device communicating in the 6 GHz band will search an automated frequency coordination (AFC) database on a daily basis for its location in order to determine which frequencies it can use without causing interference. AFC generally provides yes/no responses for 6 GHz frequency usage according to the Global Positioning System (GPS) location of the specific access point (AP).

In the case of providing wireless connectivity to moving nodes, the clients communicating with a particular AP may be quite far away from the location reported by the AP. As a result, in some circumstances there may be a change (or "delta") between the location used to search the AFC database (i.e., the location of the static AP) and the location of the client that may attempt to use the 6 GHz frequency for telecommunications.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device determines a physical location of a mobile client of wireless network. The device performs a frequency lookup for the mobile client from an automated frequency coordination (AFC) service using the physical location of the mobile client. The device then selects a frequency to be used by the mobile client based on the frequency lookup, and causes the mobile client to use the frequency to communicate with the wireless network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
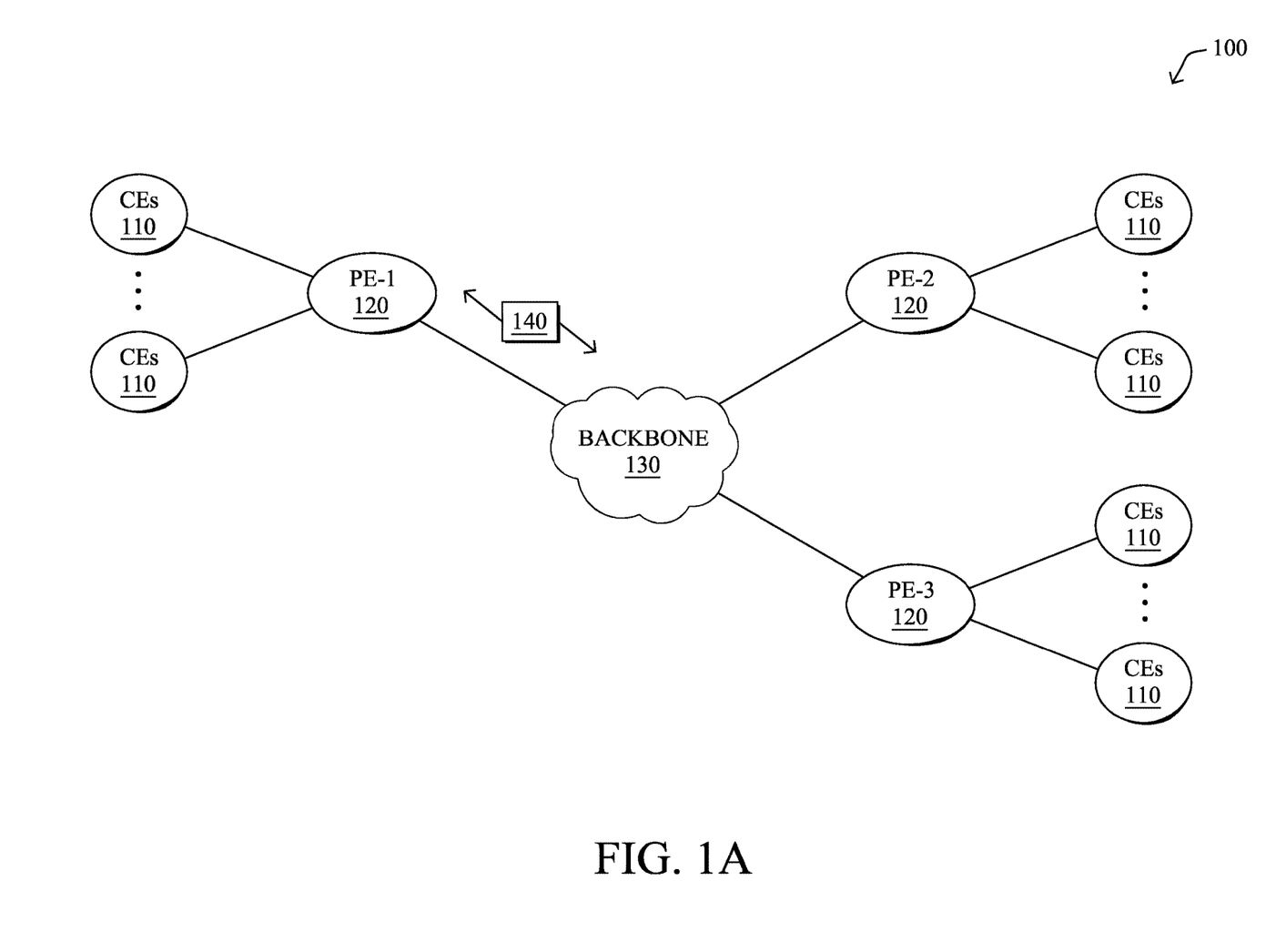
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
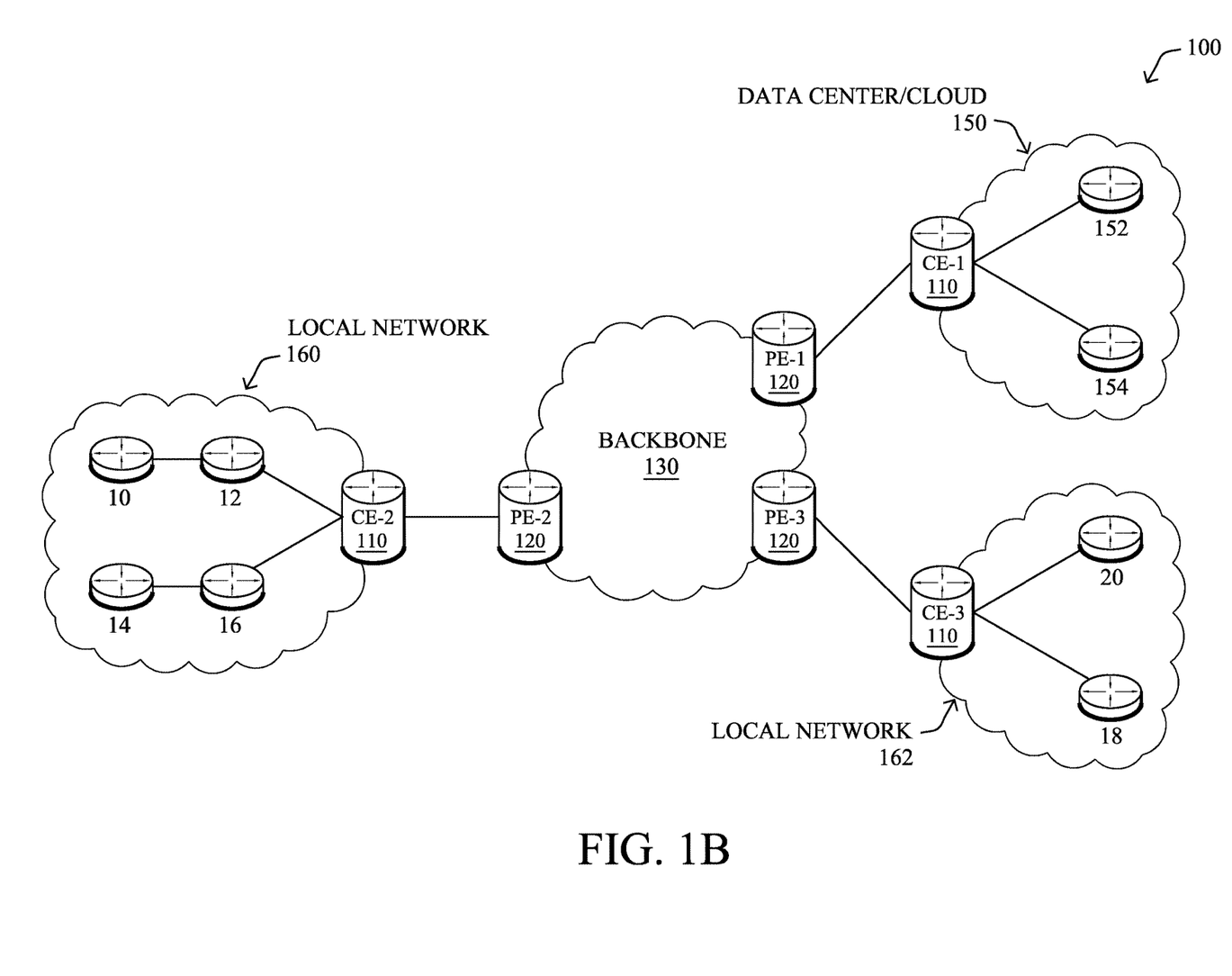

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
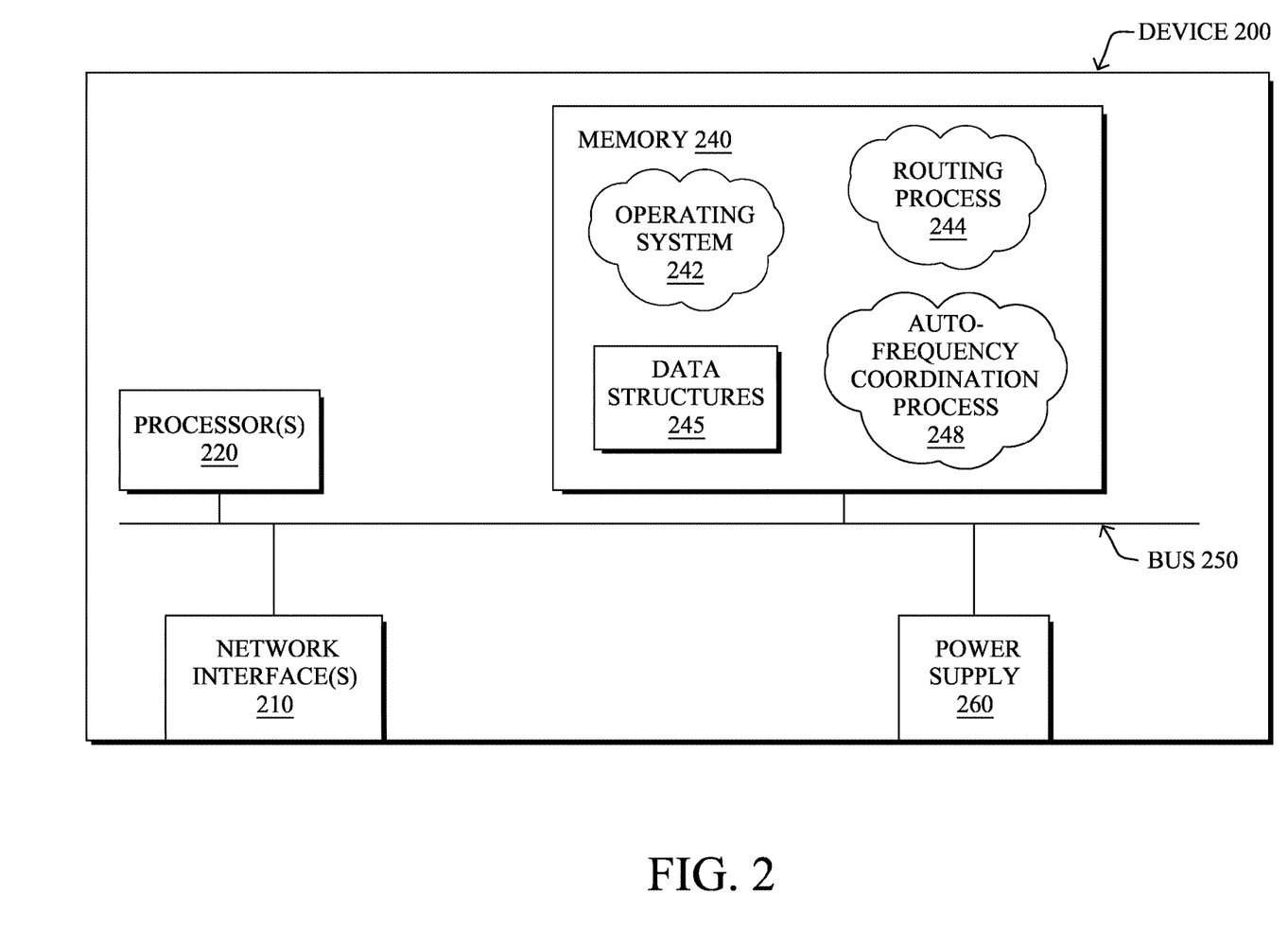
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected (coupled) by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or an Automated Frequency Coordination process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, Automated Frequency Coordination process 248 includes computer-executable instructions executable by processor 220 to perform functions related to a mobile system roaming from one wireless access point to another. To this end, Automated Frequency Coordination process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE). Another protocol that Automated Frequency Coordination process 248 may utilize is the Control and Provisioning of Wireless Access Points (CAPWAP) protocol.

Figure 3:
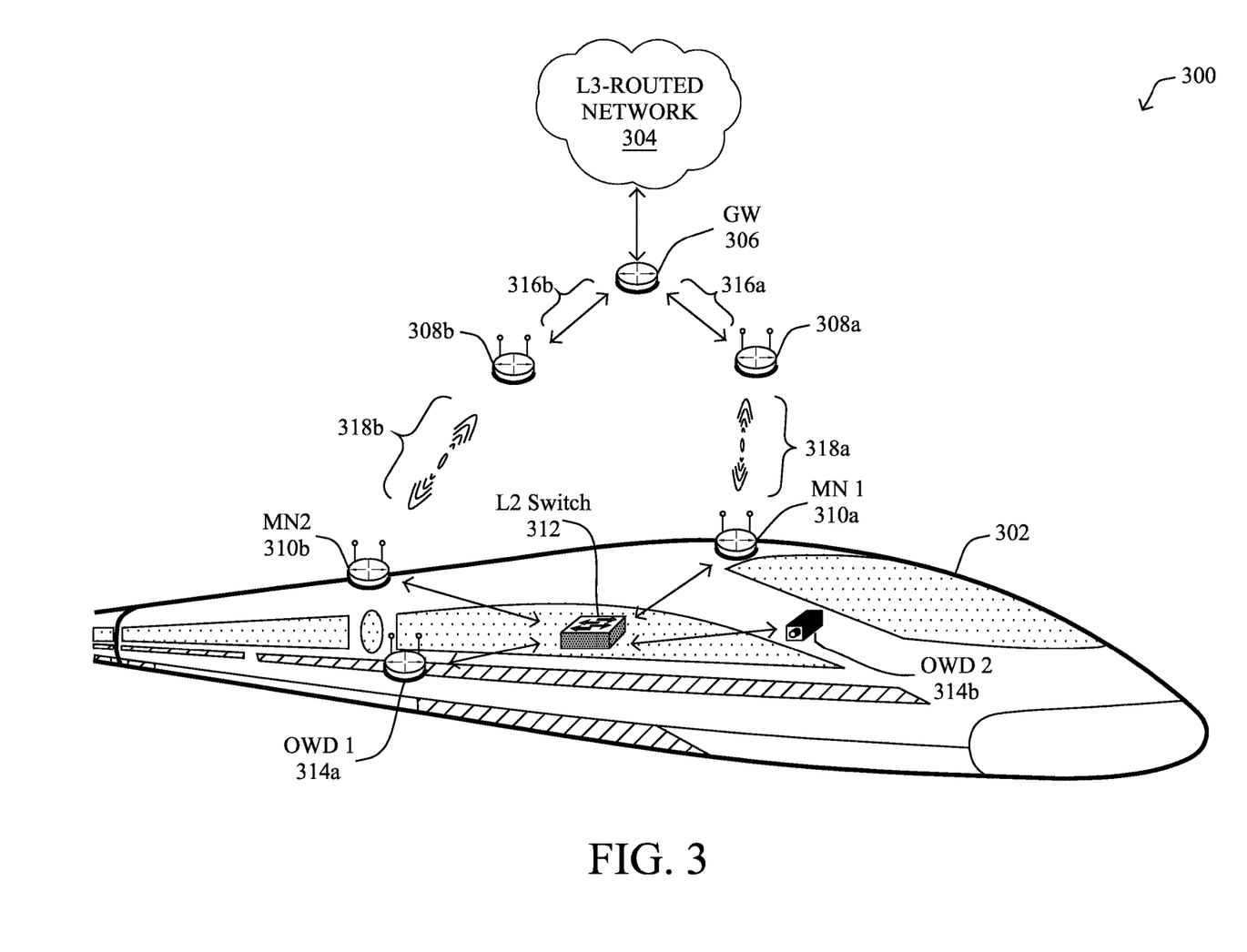
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first mobile node 310a and a second mobile node 310b. Each mobile node 310 may generally include: 1.) a wireless interface to exchange data with wireless access points of the backhaul network and 2.) a local interface to exchange data with the local network of mobile system 302. For instance, mobile node 310a and mobile node 310b may each have a wired connection to L2 switch 312.

As would be appreciated, mobile node 310a and mobile node 310b may be located on mobile system 302 at a distance from one another, so as to provide spatial diversity to the potential wireless connection points utilized by mobile system 302. For example, mobile node 310a may be located near the front of mobile system 302 (e.g., the head-end of a train), while mobile node 310b may be located farther towards the rear of mobile system 302 than that of mobile node 310a. Thus, even if a particular mobile node 310 does not have a reliable wireless connection to the backhaul system, another mobile node 310 of mobile system 302 may (e.g., if the train is going around a curve in the track, etc.). In some instances, mobile nodes 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless base stations/access points 308. For instance, as shown, there may be trackside access points 308a-308b shown. Note that while these wireless access points are referred to herein as 'trackside,' their locations can be varied depending on the deployment scenario (e.g., roadside, etc.).

During operation, access points 308a-308b may form wireless connections with mobile node 310a and/or mobile node 310b, to provide wireless connectivity to mobile system 302 as it travels. To this end, each access point 308 may include at least 1.) a wireless interface to communicate with a mobile node 310 and 2.) an interface to communicate with a gateway 306, denoted "GW" for simplicity. Typically, the connections between access points 308a-308b and gateway 306 are wired connections that use a suitable wired communication protocol, such as Ethernet.

Gateway 306 represents the other end of the backhauling system and provides Layer-3 (L3) routing functions. To do so, gateway 306 may include at least one interface connected to L3-routed network 304, as well as any number of interfaces to communicate with access points 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that mobile node 310a has formed a wireless connection 318a with access point 308a. Such a connection may be formed using a suitable transmission protocol, such as the Prodigy protocol by Fluidmesh (now Cisco Systems) or another wireless protocol that supports extremely fast handoffs. Consequently, mobile node 310a may establish a first tunnel over wireless connection 318a. gateway 306 and access point 308a may form a second tunnel via their connection 316a, likewise. Thus, when access point 308a sends traffic that it receives from mobile node 310a towards gateway 306, it may encapsulate the traffic and tunneled via the first tunnel, which access point 308a then encapsulates for transport via the second tunnel to gateway 306. A similar approach may be taken with respect to wireless connection 318b between mobile node 310b and access point 308b, as well as connection 316b between access point 308b and gateway 306.

In alternative embodiments, a single L2 tunnel may be established between each access point 308 and gateway 306. This tunnel will carry L2 traffic between gateway 306 and the mobile node 310 to which the access point 308 is connected. For instance, a first L2 tunnel may be formed between gateway 306 and access point 308a over which traffic conveyed between access point 308a and mobile node 310a may be transported, assuming that wireless connection 318a exists. Similarly, another gateway 306 and access point 308b may form a second L2 tunnel over which traffic conveyed between access point 308b and mobile node 310b may be transported, assuming that wireless connection 318a exists.

Typically, only a single wireless link is active at any given time between a mobile system, such as mobile system 302, and any given access point 308. For instance, assume that mobile node 310a is wirelessly connected to access point 308a. In such a case, any other mobile node 310 on mobile system 302 (e.g., mobile node 310b, etc.) may be in an idle state at that time. In other words, one of the mobile nodes (e.g., mobile node 310a) may be designated as the primary, while the other is designated as the secondary (e.g., mobile node 310b) and remains idle. As mobile system 302 roams, the primary node may begin passing its traffic to the secondary node, to begin leveraging its own connection to the fixed infrastructure. In turn, the roles of the two nodes may be switched, thereby making mobile node 310a the secondary node and mobile node 310b the primary node.

As noted above, backhaul connectivity in many wireless mesh networks in fixed deployments for fast-moving clients/nodes rely on some form of tunneling, such as through the use of MPLS, CAPWAP, EoGRE, or the like. In many of these cases, tunneling is hierarchical in that tunnels are carried within tunnels, in order to preserve segmentation across different domains and abstract network characteristics. To do so, a packet may be encapsulated any number of times with different tunnel headers, during its transit to its destination (e.g., the network gateway, etc.).

One of the challenges with respect to such a mesh-based backhaul network is its relative size. Indeed, consider the case of a backhaul network that provides wireless connectivity to trains traversing a railway. In such a case, the nodes/devices of the mesh may be quite numerous and be distributed across any number of kilometers.

Further, in the U.S., the Federal Communications Commission (FCC) has mandated the use of automated frequency coordination (AFC), in order to communicate in the 6 GHz band. Under the current requirement, a device communicating in the 6 GHZ band will need to search an AFC database on a daily basis for its location to determine which frequencies it can use without causing interference. More specifically, AFC provides yay/nay responses for 6 GHz frequency usage according to the Global Positioning System (GPS) location of the specific access point (AP). However, in the case of providing wireless connectivity to moving nodes, the clients communicating with a particular AP may be quite far away from the location reported by the AP, as discussed in more detail below.

Figure 4:
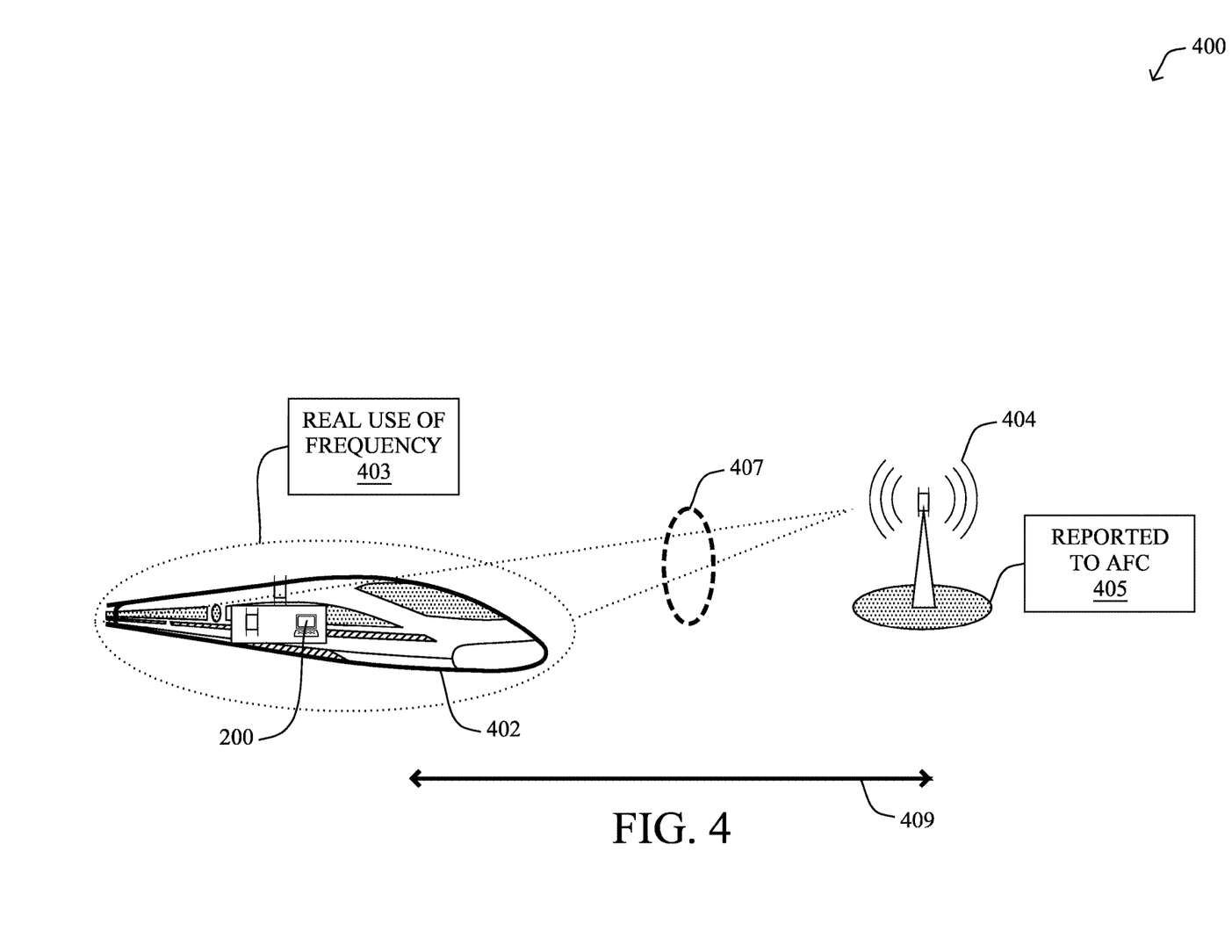
FIG. 4 illustrates an example of a system in which a train communicates with an access point from a distance.

FIG. 4 illustrates an example of a system 400 in which a train 402 communicates with an access point 404 from a distance 409. The access point 404 can be a Fluidmesh access point, or other suitable access point. In various embodiments, the access point 404 communicates with the train 402 and/or the device 200 using beams 407 (e.g., electromagnetic radiation at particular frequencies to transfer information).

The distance 409 can be on the order of kilometers, although embodiments are not so limited. In such a case (e.g., when the distance is on the order of kilometers), there is a significant delta between the location used to search the automated frequency coordination database (i.e., the location of the access point 404, which can be a static AP) and the location of the client (e.g., a device 200 on the train 402) that is going to use the 6 GHz communication frequency.

As shown in FIG. 4, the real use of the frequency 403 (e.g., the 6 GHz frequency) can occur at a device 200 on the train 402, while the automated frequency coordination 405 can occur at the access point 404. For example, the device 200 on the train 402 can connect to the access point 404 and can enjoy the benefit of automated frequency coordination 405 to, for example, operate the device 200 using the 6 GHz communication frequency.

Although the non-limiting examples described herein are made with reference to a device 200 that is located on a train 402, it will be appreciated that a device 200 located on other types of conveyances, such as trams, gondolas, airplanes, buses, automobiles, boats, spacecraft, etc. are contemplated within the disclosure. Stated alternatively, the non-limiting examples herein are described for simplicity in relation to a train 402, but embodiments are not limited to a train 402, or even to planes, trains, and automobiles, and can be applied to any conveyance known or to be developed.

An observation herein is that, in general, the automated frequency coordination (AFC) assignment for a device 200 (e.g., a station (STA), access point (AP), personal computer, laptop computer, mobile computer, smartphone, etc.) may be based on a report from the access point 404 and may include a location report associated with the access point 404 and information associated with the device 200. In general, the AFC assignments are provided to the device 200 with respect to a relatively long time period (e.g., a day, a week, a month, or longer). However, in the case of relatively fast-moving conveyances, such as trains, airplanes, etc., there is an opportunity to account for the location of the device 200 as it moves within the conveyance in order to improve the AFC assignment for the device 200 in comparison to previous approaches.

Destination-Based Automated Frequency Coordination

The techniques herein introduce a new automated frequency coordination (AFC) mechanism to support 6 GHz communications. Rather than perform AFC lookups based solely on the location of the access point (AP), as is currently required, the techniques herein propose a client-centric approach that instead takes into account the location of the client when performing the frequency selection.

Specifically, according to one or more embodiments of the disclosure as described in detail below, a device determines a physical location of a mobile client of wireless network. The device performs a frequency lookup for the mobile client from an AFC service using the physical location of the mobile client. The device then selects a frequency to be used by the mobile client based on the frequency lookup, and causes the mobile client to use the frequency to communicate with the wireless network.

Illustratively, the techniques described herein may be performed by hardware, software, and/or firmware, such as in accordance with the Automated Frequency Coordination process 248, which may include computer executable instructions executed by the processor 220 (or independent processor of interfaces 210) to perform functions relating to the techniques described herein, e.g., in conjunction with routing process 244.

Figure 5:
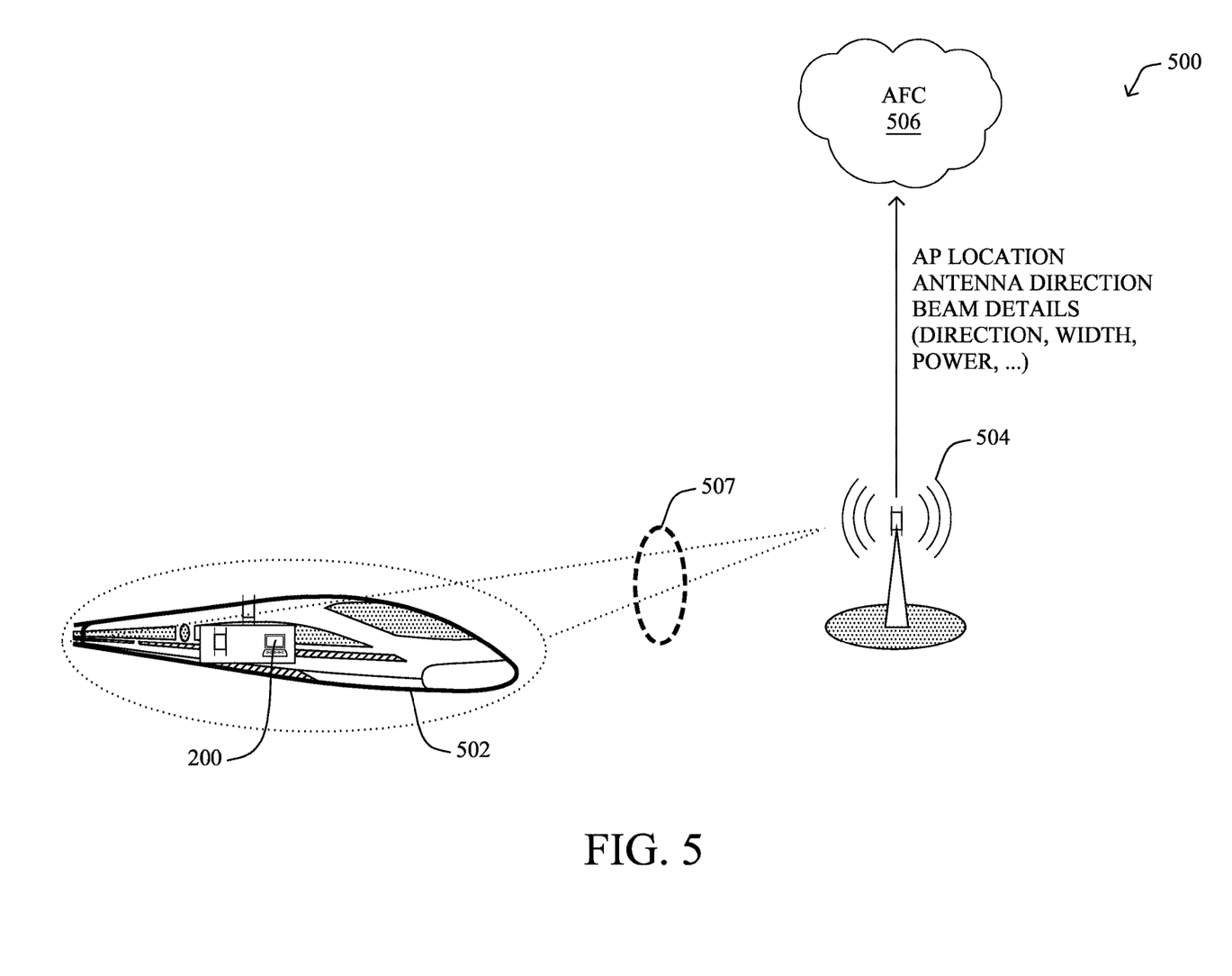
FIG. 5 illustrates an example of a system for destination-based automated frequency coordination.

Operationally, FIG. 5 illustrates an example of a system 500 for destination-based automated frequency coordination. As shown in FIG. 5, and the Figures thereafter, embodiments of the present disclosure allow for the automated frequency coordination 506 service to include additional information (and provide such information to the access point 804 and/or the device 200) that is not provided in current approaches. For example, the access point 504 can declare its physical location to, for example, the train 502 and, hence to a device 200 located on the train 502, together with additional information, such as the types of antennae utilized by the access point 504, the direction such antennae are pointing, and/or details associated with beams being transmitted from the access point 504. In some embodiments the details associated with the beams 509 can include beamforming details, beam shaping details, such as a direction along which a beam 509 is formed, a width associated with the beam 509, and/or a power associated with the beam 509, among other such details.

As used herein, an "automated frequency coordination service" or "automated frequency coordination protocol." as well as variants thereof, generally refers to a spectrum use coordination system that consists of a registered database of all the bands in use by various types of radio frequency services in a particular area. It may be used by Wi-Fi access points (APs), especially those that operate in the newly allocated 6 GHZ band (5.925-7.125 GHz). An automated frequency coordination service can further contain a database of existing 6 GHz operators, including geolocation, frequencies, power levels, antenna coverage, etc.

It is noted that, in order to provide automated frequency coordination 506 utilizing the methodologies of FIG. 5, the turnaround time, particularly in the case of the device 200 being located on a train 502 or other rapidly moving conveyance, for the automated frequency coordination 506 service to provide information to the device 200 may be relatively fast. In order to alleviate this concern, various embodiments allow for the automated frequency coordination 506 service to pre-exchange at least some of the additional information mentioned above with, for example, predicted timestamps, and provide the information to the device 200 and/or the access point 504 in advance.

However, it will be appreciated that in scenarios where the conveyance (e.g., the train 502) is moving, the location of the device 200 may become more important than the physical location of the access point 504, as discussed in connection with FIG. 6, below.

Figure 6:
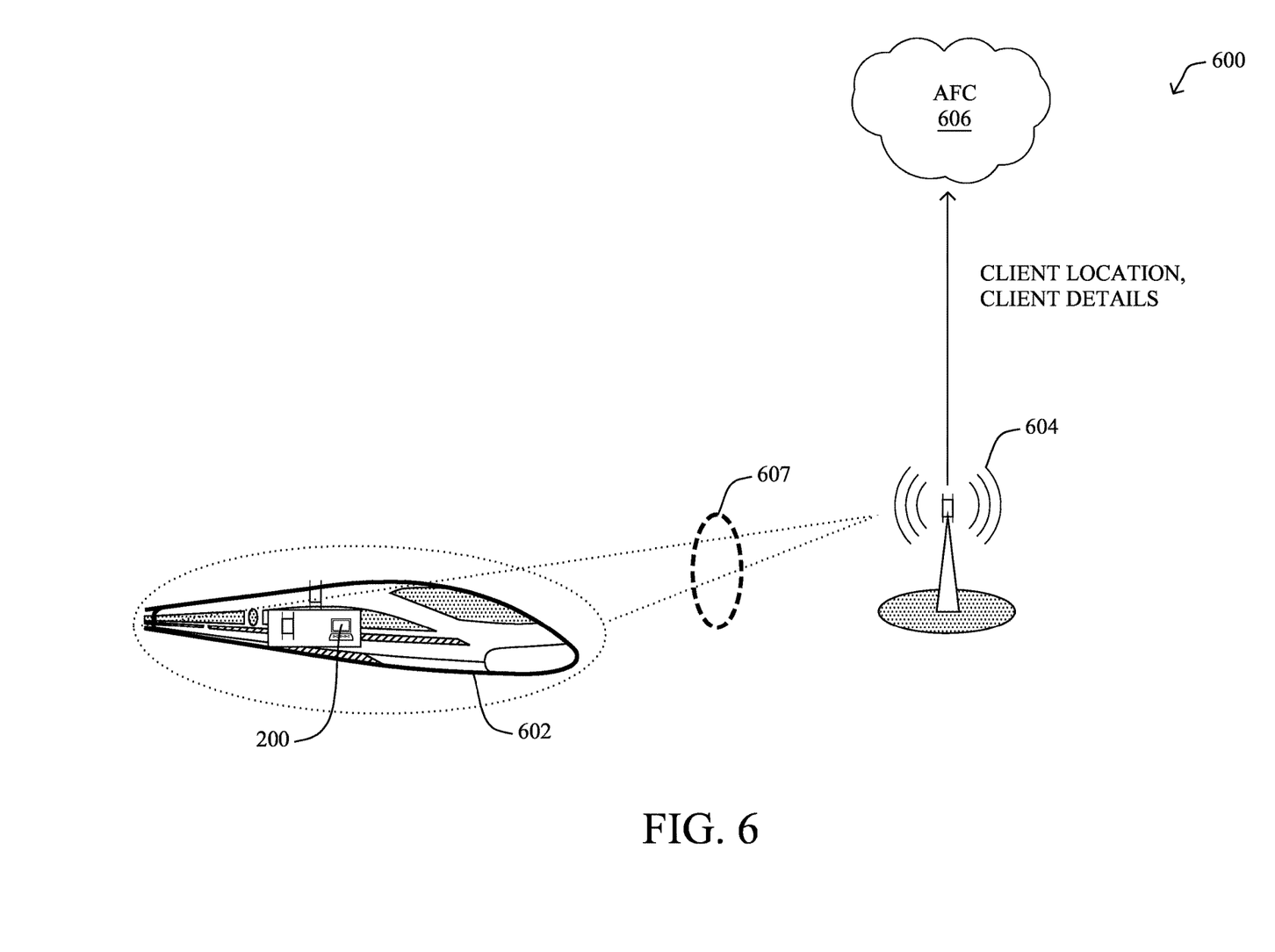
FIG. 6 illustrates another example of a system for destination-based automated frequency coordination.

Operationally, FIG. 6 illustrates another example of a system 600 for destination-based automated frequency coordination. In addition to the embodiment shown in FIG. 5, the example of FIG. 6 further allows for the automated frequency communication 606 service to provide client details from the access point 604. That is, in the embodiment illustrated in FIG. 6, client location information and/or client details can be provided in addition to, or in the alternative to, the types of antennae utilized by the access point 604, the direction such antennae are pointing, and/or details associated with beams 609 being transmitted from the access point 604 described in connection with FIG. 5.

In various embodiments, the device 200 receives the information from the automated frequency communication 606 service and/or from the access point 604 based on details of the device 200, such as the physical location of the device 200. As mentioned in more detail, herein, this client-centric approach in which the location of the device 200 is taken into account when performing frequency selection for the device 200 improves communication for the device 200 in comparison to approaches that perform frequency selection based solely on the location of the access point 604.

Figure 7:
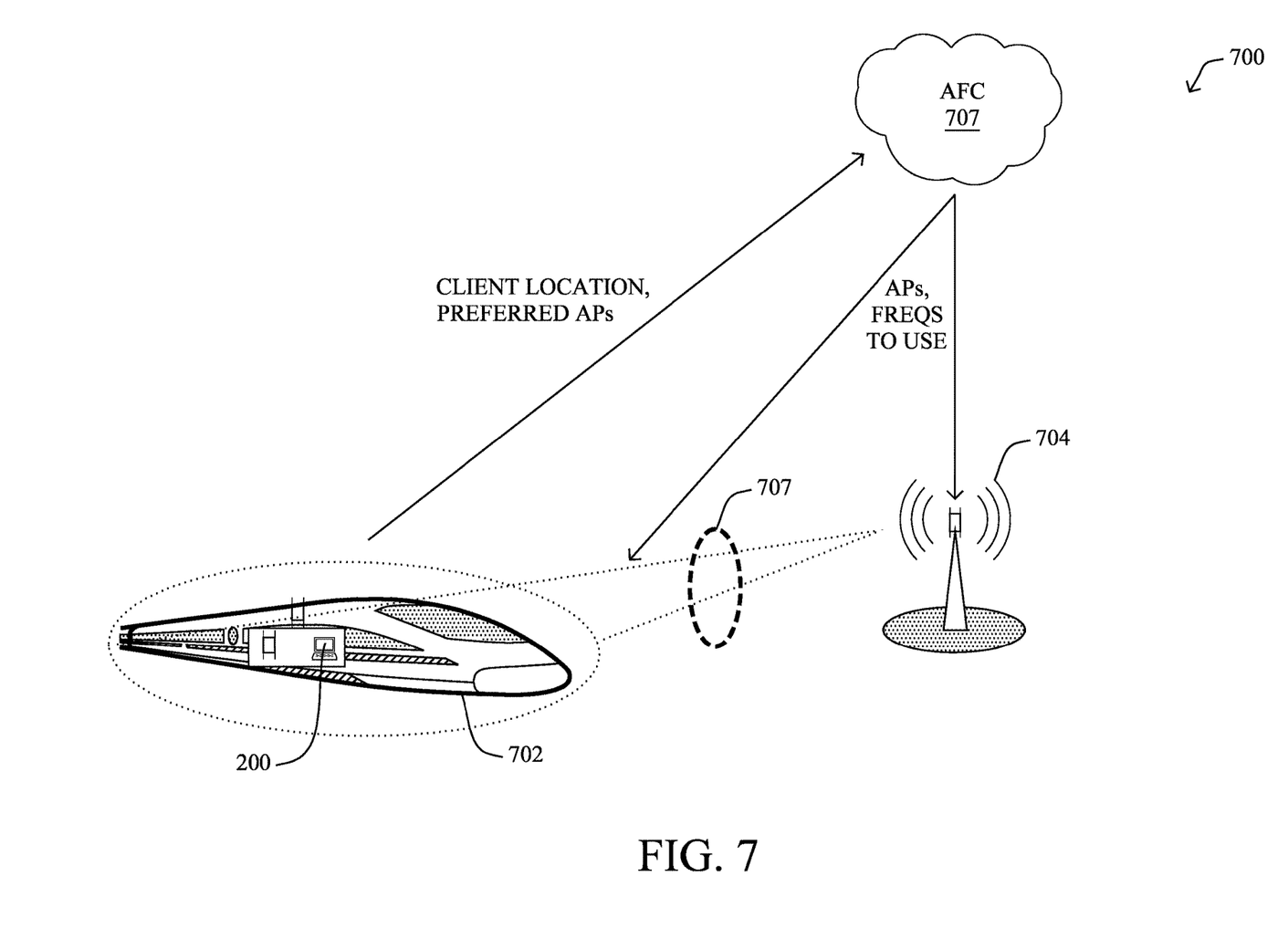
FIG. 7 illustrates yet another example of a system for destination-based automated frequency coordination.

Operationally, FIG. 7 illustrates yet another example of a system 700 for destination-based automated frequency coordination. As shown in FIG. 7, a train 702 that includes a device 200 is in communication with an access point 704. The example of FIG. 7 further allows the for the automated frequency coordination 706 service to provide a list of frequencies to use and/or a list of what access points to use to the device 200. In some embodiments, the device 200 may have an active connection to the access point 704 and/or to the automated frequency coordination 706 service to request the list of frequencies to use and/or the list of what access points to use as the device 200 travels on the train 702 or other conveyance.

For instance, as shown in FIG. 7, the device 200 can transmit a current location associated with the device 200 and/or a list of preferred access points (such as the access point 704) to the automated frequency coordination 706 service. In this example, the automated frequency coordination 706 service can transmit a list of preferred access points and/or transmission frequencies to the device 200 and/or an access point, such as the access point 704. The preferred access points can be determined by a user of the device 200 and/or may be determined by the automated frequency coordination 706 service.

In various embodiments, information corresponding to frequencies to use and/or access points to use as the device 200 travels on the train 702 can be provided in addition to, or in the alternative to, the client location information and/or client details described in connection with FIG. 6, and/or the types of antennae utilized by the access point 704, the direction such antennae are pointing, and/or details associated with beams 709 being transmitted from the access point 704 described in connection with FIG. 5.

Further, in various embodiments, the device 200 receives the information from the automated frequency coordination 706 service and/or from the access point 704 based on details of the device 200, such as the physical location of the device 200. As mentioned in more detail, herein, this client-centric approach in which the location of the device 200 is taken into account when performing frequency selection for the device 200 improves communication for the device 200 in comparison to approaches that perform frequency selection based solely on the location of the access point 704.

Figure 8:
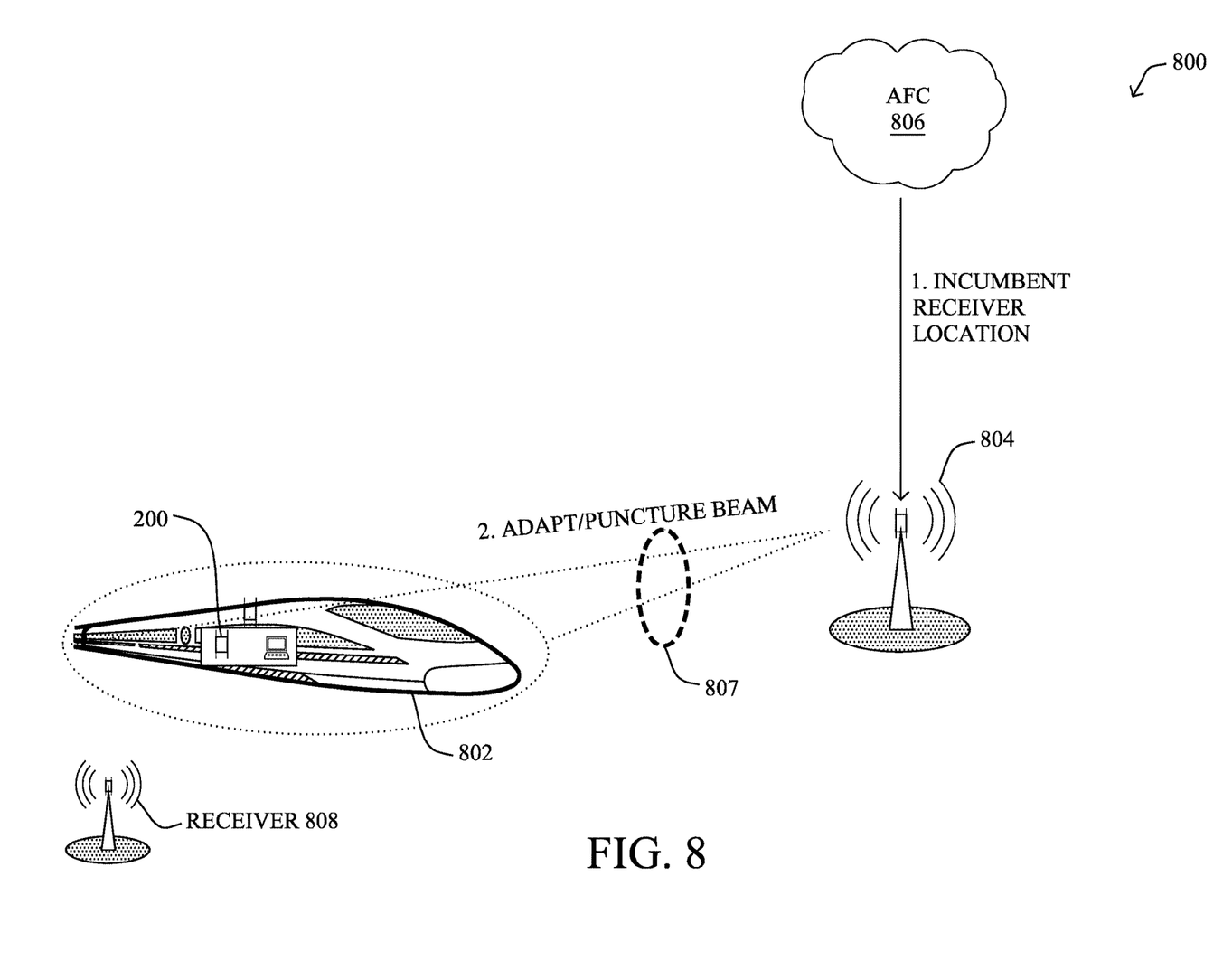
FIG. 8 illustrates still yet another example of a system for destination-based automated frequency coordination.

Operationally, FIG. 8 illustrates still yet another example of a system 800 for destination-based automated frequency coordination. As shown in FIG. 8, a train 802 that includes a device 200 is in communication with an access point 804. The example of FIG. 8 further allows the for the automated frequency communication 806 service to provide a list of incumbent receivers (e.g., the access point 804 and/or the access point 808) to the device 200, the access point 804, and/or the access point 808. The list of incumbent receivers can include a list of access points the device 200 is in communication with or was previously in communication with prior to a handoff occurring in which the device 200 begins to communicate with a receiver or access point that is not the incumbent receiver or access point.

In general, the incumbent receiver(s) or access point(s) can be susceptible to interference (e.g., destructive interference) when signals from other (non-incumbent) receiver(s) and/or access point(s) are present. Therefore, providing, by the automated frequency communication 806 service, the list of incumbent receivers can allow an access point and/or the device 200 to take a corrective action to mitigate the interference associated with the incumbent receiver and/or incumbent access point.

For example, as shown in FIG. 8, the access point 804 can perform adaptive beamforming (e.g., through puncturing the beam 807) to minimize interference that the incumbent receiver (e.g., the access point 804) may be subjected to. Embodiments are not so limited, and in some embodiments, the access point 804 and/or the access point 808 can perform beam steering or other suitable RF techniques involving the beam 807 to perform signal processing on the beam 807 to minimize interference that the incumbent receiver (e.g., the access point 804) may be subjected to.

Further, in various embodiments, the device 200 receives the information from the automated frequency communication 806 service and/or from the access point 804 based on details of the device 200, such as the physical location of the device 200. As mentioned in more detail, herein, this client-centric approach in which the location of the device 200 is taken into account when performing frequency selection for the device 200 improves communication for the device 200 in comparison to approaches that perform frequency selection based solely on the location of the access point 804.

Figure 9:
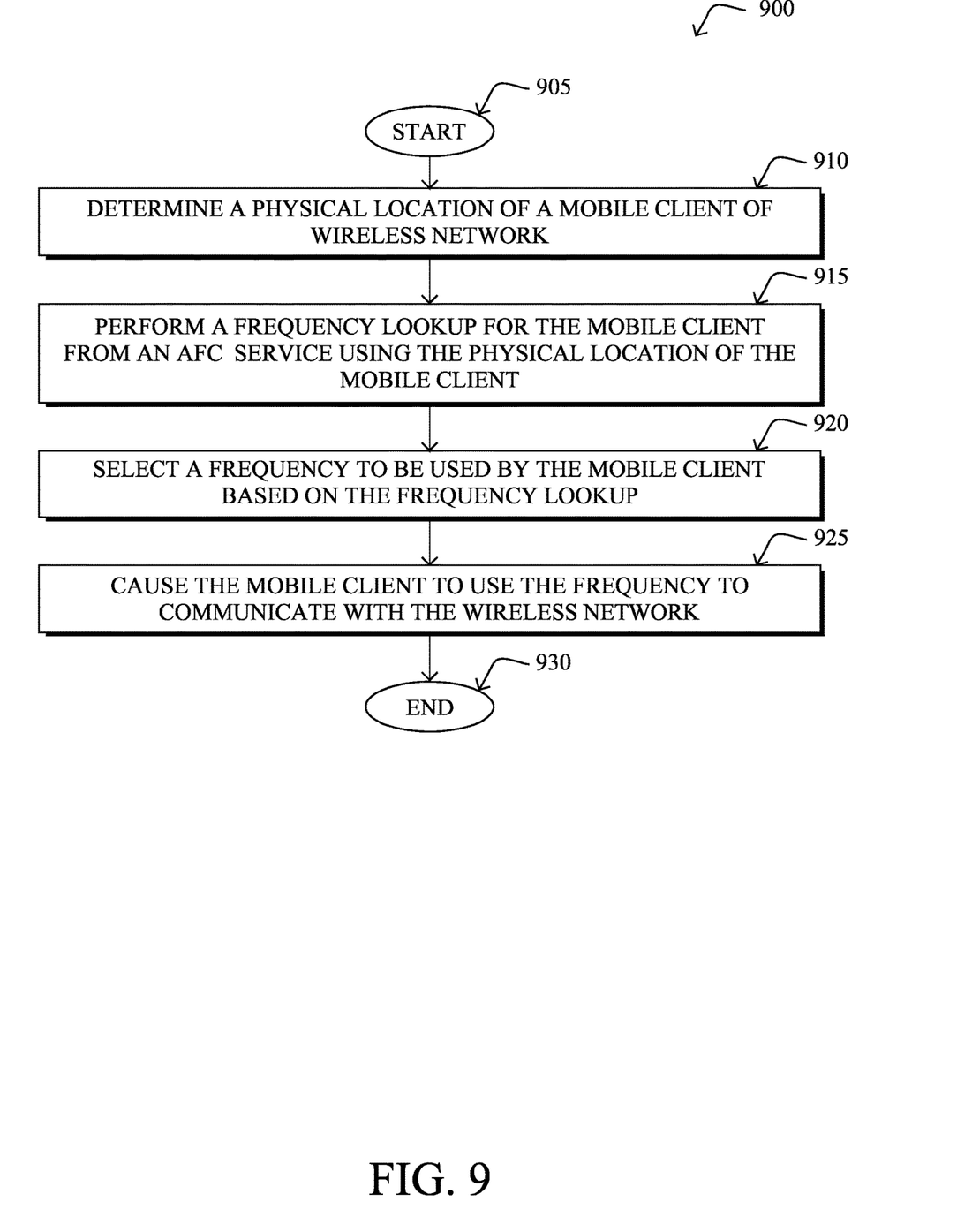
FIG. 9 illustrates an example simplified procedure for destination-based automated frequency coordination.

FIG. 9 illustrates an example simplified procedure (e.g., a method) for destination-based automated frequency coordination in accordance with one or more embodiments described herein. For example, a non-generic, specifically configured device (e.g., device 200, e.g., an apparatus) may perform procedure 900 by executing stored instructions (e.g., Automated frequency coordination process 248). The procedure 900 may start at step 905, and continues to step 910, where, as described in greater detail above, the device determines a physical location of a mobile client of wireless network. In various embodiments, the device may be an access point of the wireless network, as discussed above. Further, in some embodiments, the device may be onboard the mobile client.

In various embodiments, the device may determine the physical location based on a global positioning satellite system. Embodiments are not so limited, however, and in some embodiments, the device may determine the physical location based on predictive locating in advance of the mobile client being at the physical location.

At step 915, as detailed above, the device may perform a frequency lookup for the mobile client from an automated frequency coordination (AFC) service using the physical location of the mobile client. In various embodiments, the frequency lookup may further be based on antenna direction of the mobile client and/or the frequency lookup may further be based on antenna beam parameters of the mobile client.

At step 920, the device may select a frequency to be used by the mobile client based on the frequency lookup. In various embodiments, the frequency may be within a 6 GHz band, as discussed above.

At step 925, as detailed above, the device may cause the mobile client to use the frequency to communicate with the wireless network.

Procedure 900 then ends at step 930.

In various embodiments, the procedure 900 can further include receiving information regarding one or more incumbent receivers and causing adaptive beamforming to avoid interference with the one or more incumbent receivers.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for destination-based automated frequency coordination. Rather than perform automated frequency coordination lookups based solely on a location of an access point, as is prevalent in other approaches, embodiments herein provide a client-centric approach in which the location of the client (e.g., a client device) is taken into account when performing frequency selection for the device.

For example, as described above, embodiments herein allow for destination-based automated frequency coordination that includes a list of incumbent receivers (e.g., access points), preferred access points, frequencies to use and/or access points to use by the device, client location information and/or client details, the types of antennae utilized by an access point, the direction such antennae are pointing, and/or details associated with beams being transmitted from the access point, among other information.

While there have been shown and described illustrative embodiments that provide for destination-based automated frequency coordination, it is to be understood that various other adaptations and modifications may be made within the spirit and scope of the embodiments herein. For example, while certain embodiments are described herein with respect to destination-based automated frequency coordination to support 6 GHz communication, embodiments are not so limited, and in particular other communication bands that use automated frequency coordination or similar techniques may also benefit from the techniques described herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a device, a physical location of a mobile client of wireless network;
   performing, by the device, a frequency lookup for the mobile client from an automated frequency coordination service using the physical location of the mobile client;
   selecting, by the device, a frequency to be used by the mobile client based on the frequency lookup; and
   causing, by the device, the mobile client to use the frequency to communicate with the wireless network.

2. The method as in claim 1, wherein the device comprises an access point of the wireless network.

3. The method as in claim 1, wherein the device is onboard the mobile client.

4. The method as in claim 1, wherein the frequency lookup is further based on antenna direction of the mobile client.

5. The method as in claim 1, wherein the frequency lookup is further based on antenna beam parameters of the mobile client.

6. The method as in claim 1, wherein the frequency is within a 6 GHz band.

7. The method as in claim 1, wherein determining the physical location is based on a global positioning satellite system.

8. The method as in claim 1, wherein determining the physical location is based on predictive locating in advance of the mobile client being at the physical location.

9. The method as in claim 1, further comprising:
   receiving information regarding one or more incumbent receivers; and
   causing adaptive beamforming to avoid interference with the one or more incumbent receivers.

10. A tangible, non-transitory, computer-readable medium having computer-executable instructions stored thereon that, when executed by a processor on a computer, cause the computer to perform a method comprising:
    determining a physical location of a mobile client of wireless network;
    performing a frequency lookup for the mobile client from an automated frequency coordination service using the physical location of the mobile client;
    selecting a frequency to be used by the mobile client based on the frequency lookup; and
    causing the mobile client to use the frequency to communicate with the wireless network.

11. The tangible, non-transitory, computer-readable medium as in claim 10, wherein the computer comprises an access point of the wireless network.

12. The tangible, non-transitory, computer-readable medium as in claim 10, wherein the computer is onboard the mobile client.

13. The tangible, non-transitory, computer-readable medium as in claim 10, wherein the frequency lookup is further based on antenna direction of the mobile client.

14. The tangible, non-transitory, computer-readable medium as in claim 10, wherein the frequency lookup is further based on antenna beam parameters of the mobile client.

15. The tangible, non-transitory, computer-readable medium as in claim 10, wherein the frequency is within a 6 GHz band.

16. The tangible, non-transitory, computer-readable medium as in claim 10, wherein determining the physical location is based on a global positioning satellite system.

17. The tangible, non-transitory, computer-readable medium as in claim 10, wherein determining the physical location is based on predictive locating in advance of the mobile client being at the physical location.

18. The tangible, non-transitory, computer-readable medium as in claim 10, wherein the method further comprises:
    receiving information regarding one or more incumbent receivers; and
    causing adaptive beamforming to avoid interference with the one or more incumbent receivers.

19. An apparatus, comprising:
    one or more network interfaces to communicate with a network;
    a processor coupled to the one or more network interfaces and configured to execute one or more processes; and
    a memory configured to store a process that is executable by the processor, the process, when executed, configured to:
      determine a physical location of a mobile client of wireless network;
      perform a frequency lookup for the mobile client from an automated frequency coordination service using the physical location of the mobile client;
      select a frequency to be used by the mobile client based on the frequency lookup; and
      cause the mobile client to use the frequency to communicate with the wireless network.

20. The apparatus as in claim 19, wherein the frequency lookup is further based on one or both of antenna direction or antenna beam parameters of the mobile client.

* * * * *